US010814885B1

(12) United States Patent
Tang et al.

(10) Patent No.: US 10,814,885 B1
(45) Date of Patent: Oct. 27, 2020

(54) CAR AND NEIGHBORING VEHICLE LANE DEPARTURE WARNING SYSTEM AND METHOD

(71) Applicant: SOUTHERN TAIWAN UNIVERSITY OF SCIENCE AND TECHNOLOGY, Tainan (TW)

(72) Inventors: Ching-Chou Tang, Tainan (TW); Yu-Chi Hsieh, Tainan (TW); Kun-Yu Li, Tainan (TW); Jhih-Deng Hong, Tainan (TW); Liang-Chi Dai, Tainan (TW); Sheng-Kai Huang, Tainan (TW); Qing-Yuan Huang, Tainan (TW); Jui-Cheng Kao, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 16/867,719

(22) Filed: May 6, 2020

(51) Int. Cl.
*B60W 50/00* (2006.01)
*B60W 50/14* (2020.01)
*B60W 30/095* (2012.01)
*B60K 35/00* (2006.01)
*G08G 1/16* (2006.01)
*H04W 4/46* (2018.01)

(52) U.S. Cl.
CPC ........... *B60W 50/14* (2013.01); *B60K 35/00* (2013.01); *B60W 30/0956* (2013.01); *G08G 1/167* (2013.01); *H04W 4/46* (2018.02); *B60K 2370/1529* (2019.05); *B60K 2370/178* (2019.05); *B60K 2370/5915* (2019.05); *B60W 2050/146* (2013.01); *B60W 2554/4045* (2020.02)

(58) Field of Classification Search
CPC ............. B60W 50/14; B60W 30/0956; B60W 2050/146; H04W 4/46; B60K 35/00; B60K 2370/1529; B60K 2370/178; B60K 2554/4045; G08G 1/167
USPC ........................................................ 340/436
See application file for complete search history.

(56) References Cited

U.S. PATENT DOCUMENTS

| 6,269,308 | B1 * | 7/2001 | Kodaka ................. G01S 13/931 701/301 |
| 7,257,478 | B2 * | 8/2007 | Sugano ................. B60W 10/06 701/96 |
| 8,258,935 | B2 * | 9/2012 | Hashimoto .......... B62D 15/029 340/435 |
| 2005/0159876 | A1 * | 7/2005 | Sugano .............. B60K 31/0008 701/96 |

(Continued)

FOREIGN PATENT DOCUMENTS

TW I455074 B 10/2014

*Primary Examiner* — Ojiako K Nwugo
(74) *Attorney, Agent, or Firm* — Rosenberg, Klein & Lee

(57) ABSTRACT

A car and a neighboring vehicle lane departure warning system and method are provided. The system includes a cloud server and a plurality of cars connected to the cloud server. Each car includes a vehicle body and a neighboring vehicle lane departure warning apparatus disposed on the vehicle body. The cloud server outputs a reminder signal to the cars within a specific distance of the neighboring vehicle after receiving a neighboring vehicle lane departure message, so that the drivers can be informed in time that the neighboring vehicle moves out of its lane, and can keep a proper distance from the neighboring vehicle in advance to prevent accidents.

10 Claims, 5 Drawing Sheets

(56) References Cited

U.S. PATENT DOCUMENTS

| | | | |
|---|---|---|---|
| 2007/0010944 A1* | 1/2007 | Ferrebee, Jr. | G08G 1/166 |
| | | | 701/301 |
| 2013/0335213 A1* | 12/2013 | Sherony | G08G 1/167 |
| | | | 340/439 |
| 2014/0309884 A1* | 10/2014 | Wolf | G06K 9/00805 |
| | | | 701/41 |
| 2015/0091716 A1* | 4/2015 | Hathaway | G01S 13/86 |
| | | | 340/435 |
| 2016/0033640 A1* | 2/2016 | De Mersseman | G01S 7/2813 |
| | | | 342/70 |
| 2019/0051179 A1* | 2/2019 | Alvarez | H04W 12/009 |
| 2019/0071081 A1* | 3/2019 | Katayama | B60Q 9/008 |
| 2019/0315367 A1* | 10/2019 | Um | B60W 50/10 |

\* cited by examiner

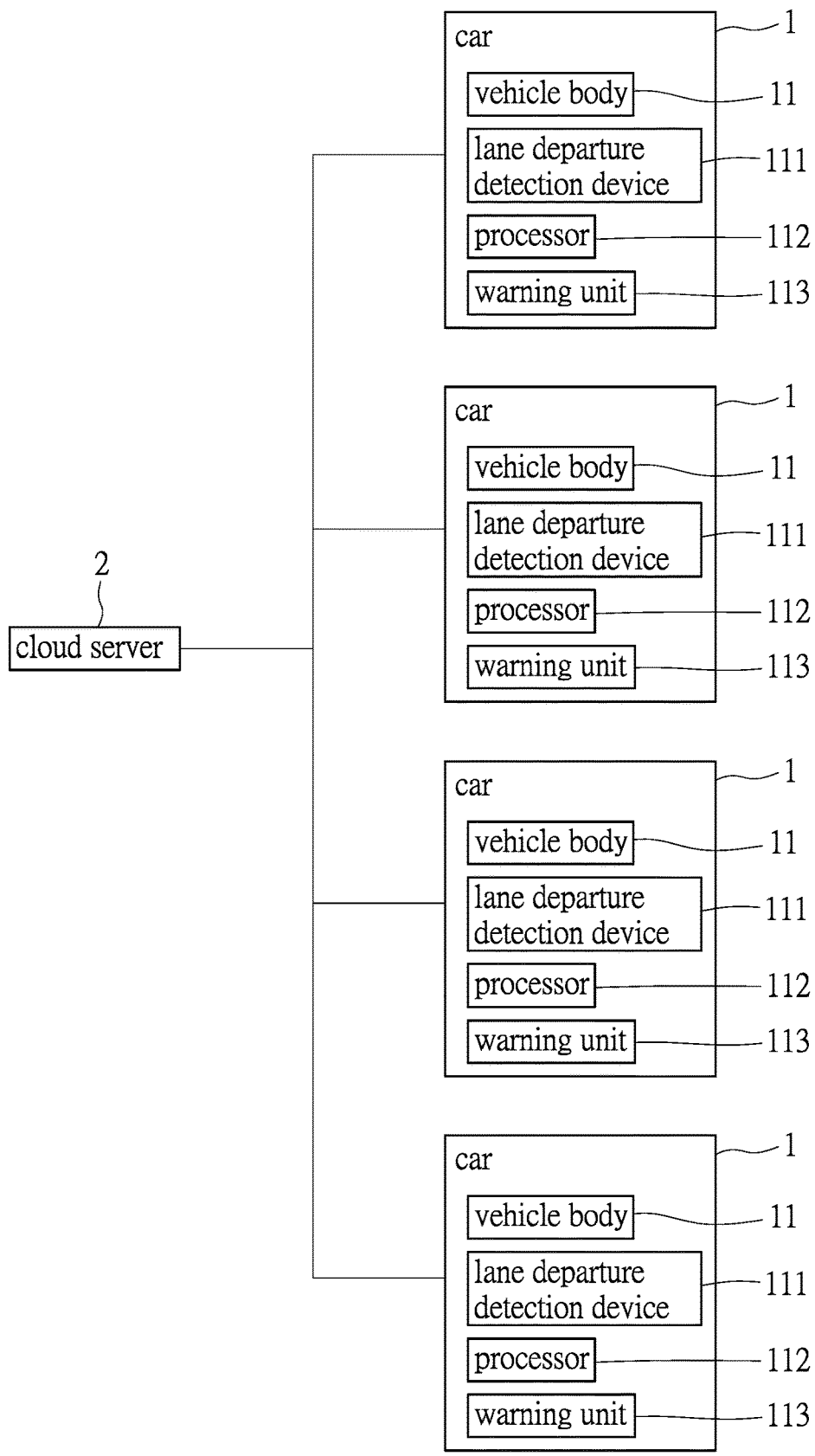
F I G . 1

CAR AND NEIGHBORING VEHICLE LANE DEPARTURE WARNING SYSTEM AND METHOD

FIELD OF THE INVENTION

The present invention relates to a driving warning system and method, and more particular, to a neighboring vehicle lane departure warning method and system for a car.

BACKGROUND OF THE INVENTION

Taiwan Patent Publication No. 1455074 discloses a vehicle image display system and a correcting method thereof, disposed on a vehicle. The method comprises the steps of: capturing at least one road image in front; obtaining a lane line and the position of an obstacle in front according to the road image in front; calculating display projection information that can overlap an actual lane line and the position of the obstacle in front after correcting; and using a motor control unit to adjust the focal length conversion or inclination of a projection unit, or adjust the inclination of a visible flat panel for generating a superimposed error correction value to correct the display projection information. Through hardware adjustment and software correction, the projection unit is configured to project the large-area display projection information that is completely superimposed on the actual road image onto the visible flat panel or the windshield of the vehicle, so that the driver can obtain intuitive driving conditions, thereby improving driving safety.

However, this can only display the position of the obstacle in front, but cannot display the driving conditions of the rear, left and right neighboring cars. Accordingly, the inventor of the present invention has devoted himself based on his many years of practical experiences to solve these problems.

SUMMARY OF THE INVENTION

According to one aspect of the present invention, a car for performing a neighboring vehicle lane departure warning method is provided, so that the driver can learn the driving state of a front, rear, left or right neighboring vehicle. The car comprises a vehicle body, at least one lane departure detection device, a processor, and a warning unit. The lane departure detection device is disposed on the vehicle body. The lane departure detection device has a detection range behind the vehicle body. When a neighboring vehicle on a lane on which the vehicle body is traveling moves out of the lane, the lane departure detection device detects a lane departure state of the neighboring vehicle and generates a neighboring vehicle lane departure message. The processor is electrically connected to the lane departure detection device and configured to receive the neighboring vehicle lane departure message. The warning unit is disposed on the vehicle body and electrically connected to the processor. The processor controls the warning unit to output a warning signal after receiving the neighboring vehicle lane departure message.

Preferably, the warning unit is a head-up display for displaying the warning signal on a front windshield of the vehicle body.

Preferably, the lane departure detection device is disposed around a periphery of the vehicle body. The lane departure detection device generates the neighboring vehicle lane departure message when a neighboring vehicle in front of the vehicle body moves out of the lane or when a neighboring vehicle on the left, right, front left, rear left, front right or rear right of the vehicle body moves out of its lane next to the lane.

According to another aspect of the present invention, a neighboring vehicle lane departure warning method is provided. When a neighboring vehicle behind a vehicle body on a lane moves out of the lane, a lane departure detection device of the vehicle body detects a lane departure state of the neighboring vehicle and generates a neighboring vehicle lane departure message. A processor controls a warning unit on the vehicle body to output a warning signal after receiving the neighboring vehicle lane departure message.

Preferably, the processor receives the neighboring vehicle lane departure message and uploads it to a cloud server. The cloud server outputs a reminder signal to a car within a specific distance of the neighboring vehicle after receiving the neighboring vehicle lane departure message.

According to a further aspect of the present invention, a neighboring vehicle lane departure warning system is provided. The neighboring vehicle lane departure warning system comprises a cloud server and a plurality of cars connected to the cloud server. Each car includes a vehicle body and a neighboring vehicle lane departure warning apparatus disposed on the vehicle body. The neighboring vehicle lane departure warning apparatus includes a lane departure detection device, a processor, and a warning unit. The lane departure detection device has a detection range around the vehicle body. When a neighboring vehicle on a lane on which the vehicle body is traveling or on an adjacent lane moves out of its lane, the lane departure detection device detects a lane departure state of the neighboring vehicle and generates a neighboring vehicle lane departure message. The processor is electrically connected to the lane departure detection device. The processor is configured to receive the neighboring vehicle lane departure message and upload the neighboring vehicle lane departure message to the cloud server. The warning unit is disposed on the vehicle body and electrically connected to the processor. The processor controls the warning unit to output a warning signal after receiving the neighboring vehicle lane departure message. The cloud server outputs a reminder signal to the cars within a specific distance of the neighboring vehicle after receiving the neighboring vehicle lane departure message.

Preferably, the specific distance is 1 kilometer.

According to the above technical features, the following effects can be achieved.

1. The lane departure detection device disposed on the vehicle body can detect the lane departure state of the neighboring vehicle on the lane on which the vehicle body is traveling, and the warning unit outputs the warning signal.

2. When one of multiple cars moves out of its lane, the cloud server will output the reminder signal to the cars within one kilometer, so that the drivers can take precautionary actions in advance to avoid traffic accidents.

3. The warning signal is displayed on the front windshield, which is convenient for the driver to receive the message that the neighboring vehicle moves out of its lane in time.

BRIEF DESCRIPTION OF THE DRAWINGS

FIG. 1 is a block diagram according to an embodiment of the present invention;

DETAILED DESCRIPTION OF THE PREFERRED EMBODIMENTS

Figure 2:
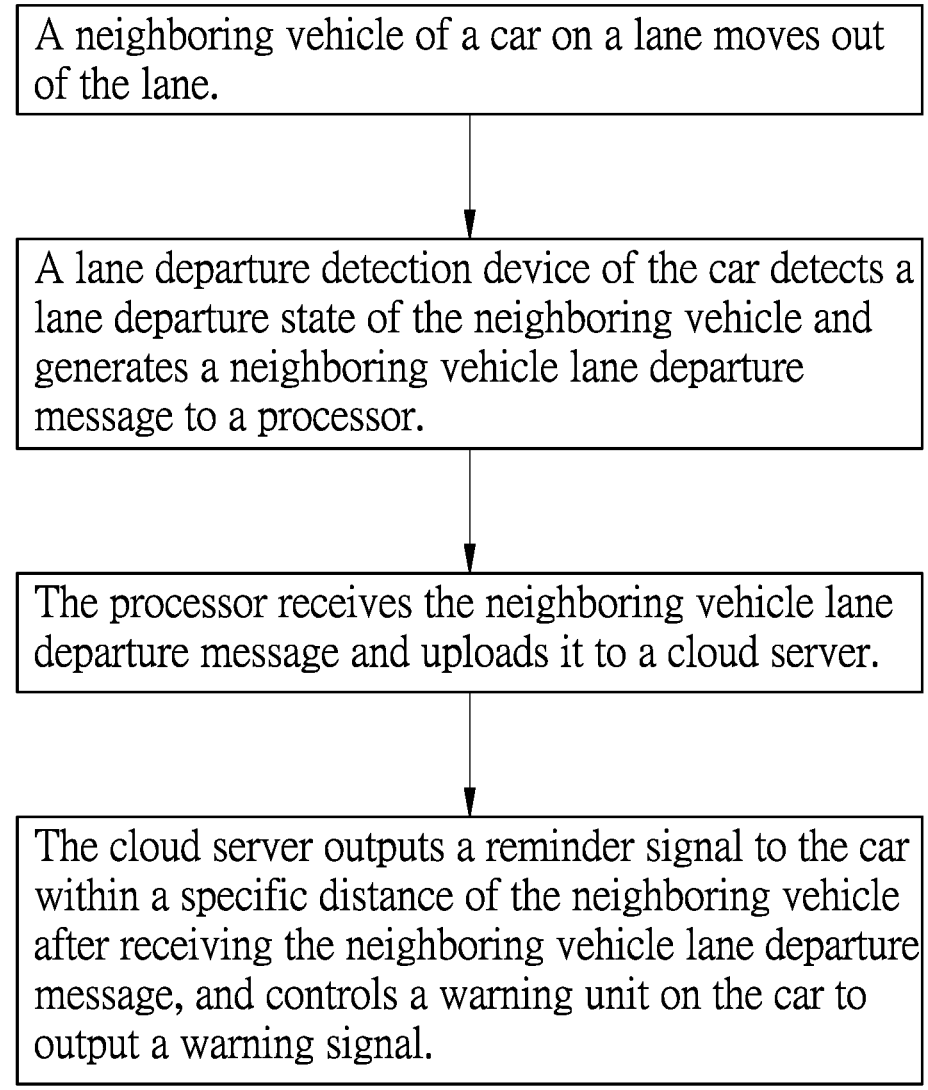
FIG. 2 is a flowchart according to an embodiment of the present invention.

Embodiments of the present invention will now be described, by way of example only, with reference to the accompanying drawings. The present invention discloses a car and a neighboring vehicle lane departure warning system and method.

As shown in FIG. 1, an embodiment of the present invention comprises a plurality of cars (1). Each car (1) includes a vehicle body (11), at least one lane departure detection device (111) disposed on the vehicle body (11), a processor (112) electrically connected to the lane departure detection device (111), and a warning unit (113) disposed on the vehicle body (11) and electrically connected to the processor (112). A cloud server (2) is connected to each car (1).

Figure 3:
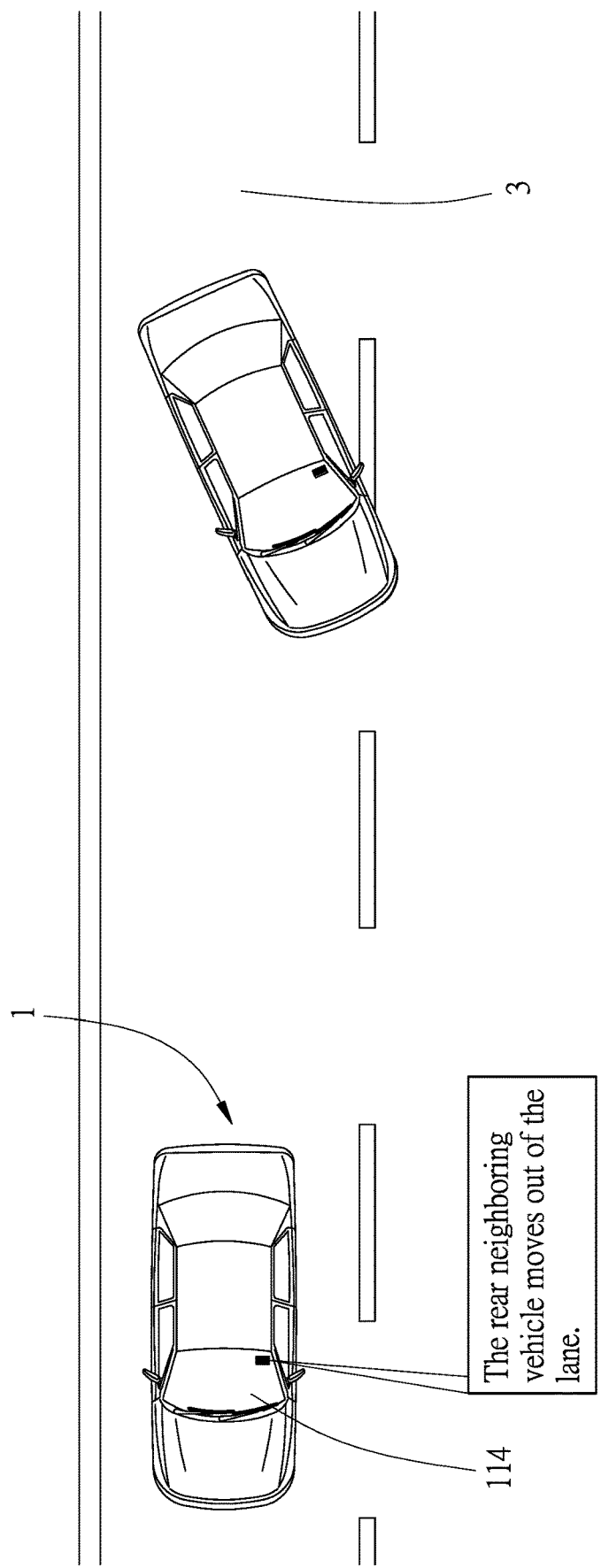
FIG. 3 is a first schematic view according to an embodiment of the present invention.

Please refer to FIG. 1 through FIG. 3. When the car (1) moves on a lane (3), the lane departure detection device (111) disposed on the car (1) has a detection range to detect whether a rear neighboring vehicle on the lane (3) moves within the lane (3). When it detects that the rear neighboring vehicle moves out of the lane (3), the lane departure detection device (111) will generate a neighboring vehicle lane departure message to the processor (112). When the processor (112) receives the neighboring vehicle lane departure message, it will control the warning unit (113) to output a warning signal. The warning unit (113) may be a head-up display disposed on a front windshield (114) of the car (1), and the warning signal may be displayed on the front windshield (114) of the car (1). When the driver of the car (1) sees the warning message, he/she can learn that the rear neighboring vehicle is leaving the lane (3), and can initially determine that the rear neighboring vehicle may make a turn or that the driver of the rear neighboring vehicle may be absent-minded or drunk, etc., so as to keep a proper distance from the rear neighboring vehicle in advance to prevent accidents. Because the driver can only learn the driving state of the rear neighboring vehicle through the rearview mirror and cannot always pay attention to the rearview mirror during the driving, the present invention can help the driver learn the driving state of the rear neighboring vehicle at any time. When something happens, the driver can learn it immediately and have more time to take precautions in order to reduce traffic accidents.

Figure 4:
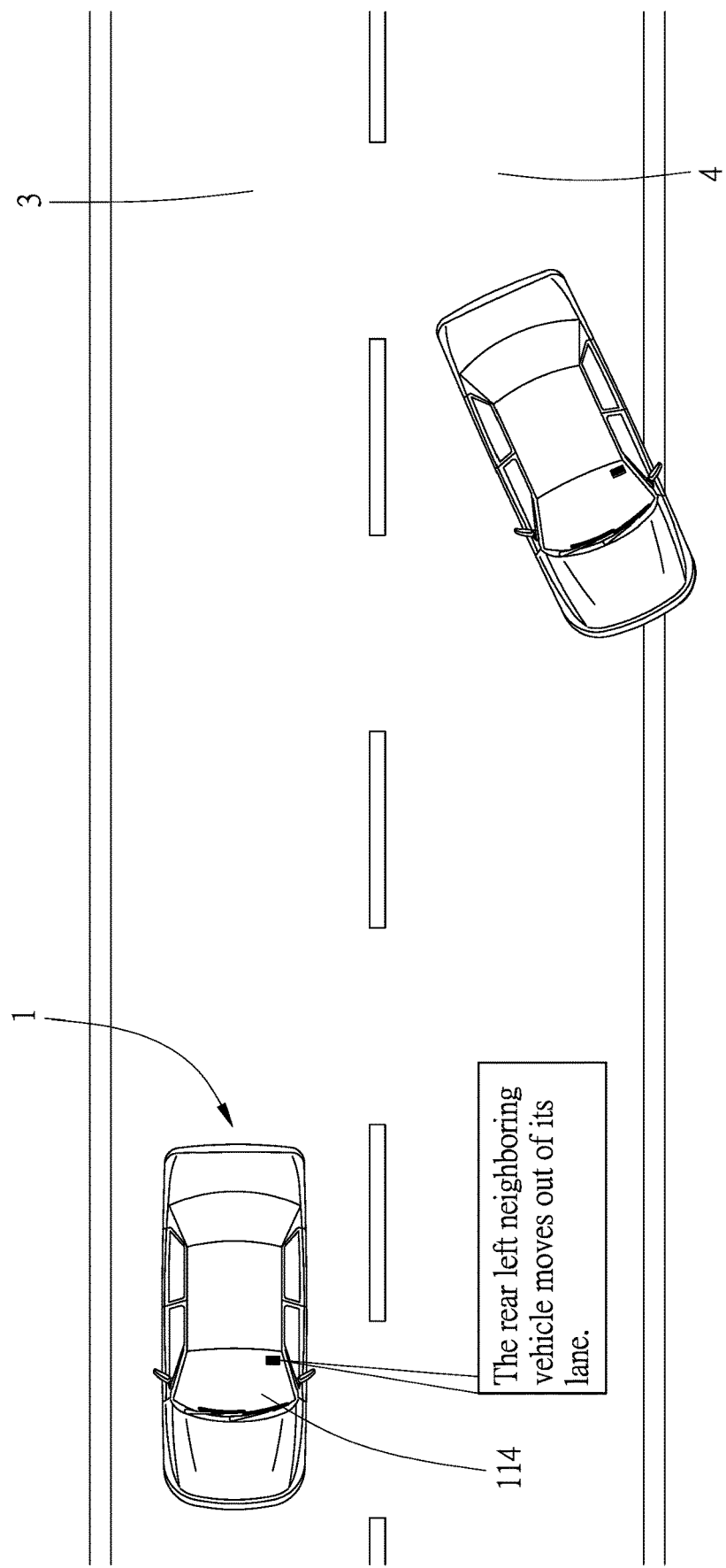
FIG. 4 is a second schematic view according to an embodiment of the present invention.

Please refer to FIG. 1, FIG. 2 and FIG. 4. The car (1) moving on the lane (3) not only detects the driving state of the rear neighboring vehicle but also detects whether a front neighboring vehicle moves out of the lane (3). In addition, it is also possible to detect whether a neighboring vehicle on the left, right, front left, rear left, front right, or rear right of the car moves out of an adjacent lane (4). When the neighboring vehicle on the left, right, front left, rear left, front right or rear right of the car moves out of the adjacent lane (4) or when the front neighboring vehicle moves out of the lane (3), a neighboring vehicle lane departure message is generated and transmitted to the processor (112). After the processor (112) receives the neighboring vehicle lane departure message, it further controls the head-up display of the front windshield (114) to display the warning signal on the front windshield (1) of the car (1). When the driver of the car (1) sees the warning message, he/she can learn that the neighboring vehicle on the left, right, front left, rear left, front right or rear right of the car moves out of the adjacent lane (4) or the front neighboring vehicle moves out of the lane (3), and can take precautionary actions in advance to avoid traffic accidents.

Figure 5:
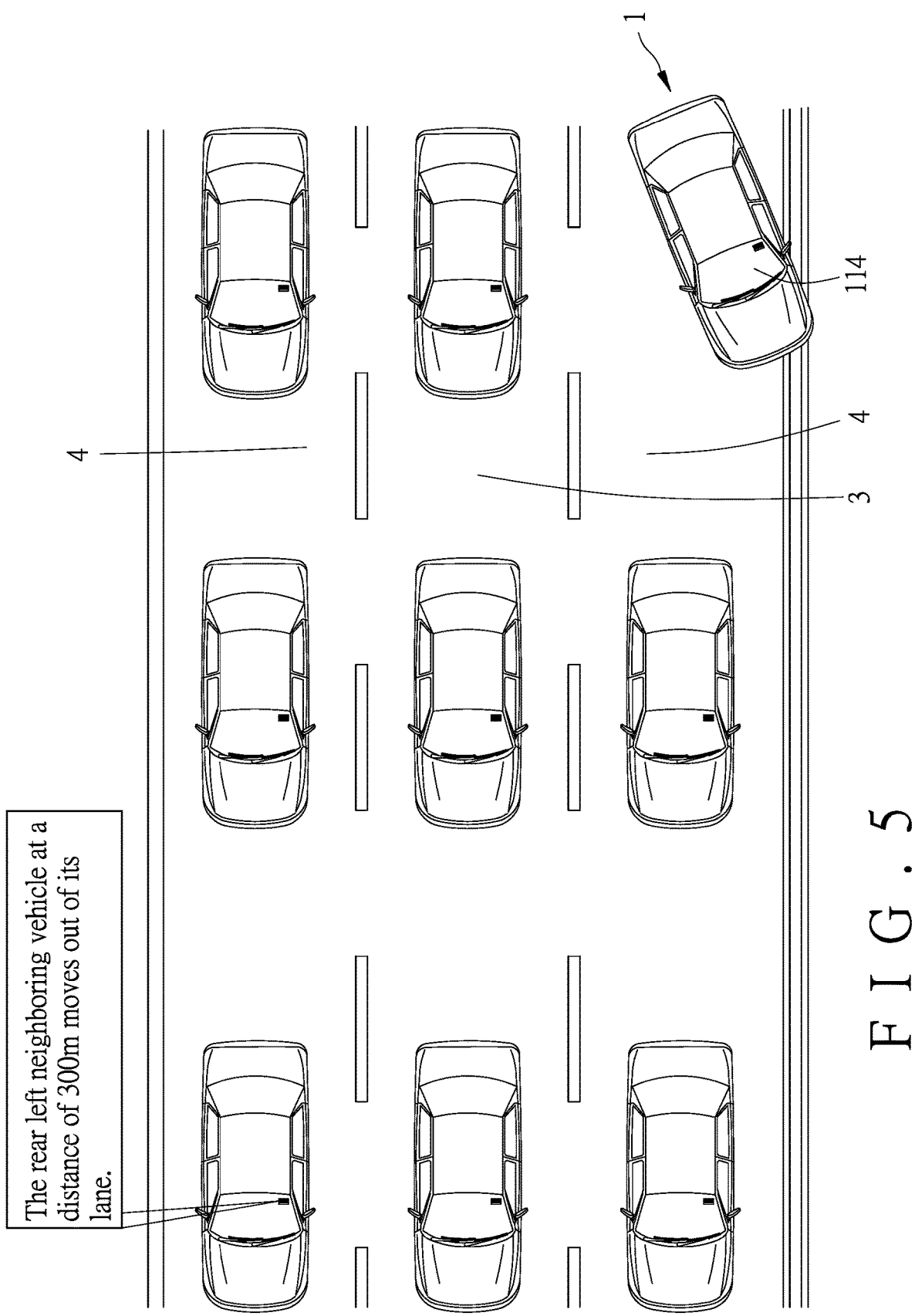
FIG. 5 is a third schematic view according to an embodiment of the present invention.

Please refer to FIG. 1, FIG. 2 and FIG. 5. Each car (1) is connected to the cloud server (2). When a car (1) moves out of an adjacent lane (4), the lane departure detection device (111) of the neighboring car (1) on the adjacent lane (4) generates a neighboring vehicle lane departure message to each processor (112). When the processor (112) receives the neighboring vehicle lane departure message, it will control the warning unit (113) to output a warning signal to be displayed on the front windshield (114), so that the driver can be informed in time that the neighboring vehicle moves out of the adjacent lane (4), and can make precautionary actions in advance to avoid accidents or a multiple vehicle collision. Besides, the processor (112) also uploads the neighboring vehicle lane departure message to the cloud server (2). After the cloud server (2) receives the neighboring vehicle lane departure message, it will output a reminder signal to a plurality of cars (1) within a specific distance near the neighboring vehicle. The specific distance is 1 kilometer.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A neighboring vehicle lane departure warning method, comprising:
  when a neighboring vehicle behind a vehicle body on a lane moves out of the lane, a lane departure detection device of the vehicle body detecting a lane departure state of the neighboring vehicle and generating a neighboring vehicle lane departure message; a processor controlling a warning unit on the vehicle body to output a warning signal after receiving the neighboring vehicle lane departure message.

2. The neighboring vehicle lane departure warning method as claimed in claim 1, wherein the warning signal is displayed on a front windshield of the vehicle body.

3. The neighboring vehicle lane departure warning method as claimed in claim 1, wherein the lane departure detection device generates the neighboring vehicle lane departure message when a neighboring vehicle in front of the vehicle body moves out of the lane; the lane departure detection device generates the neighboring vehicle lane departure message when a neighboring vehicle on the left, right, front left, rear left, front right or rear right of the vehicle body moves out of its lane next to the lane.

4. The neighboring vehicle lane departure warning method as claimed in claim 1, wherein the processor receives the neighboring vehicle lane departure message and uploads it to a cloud server, and the cloud server outputs a reminder signal to a car within a specific distance of the neighboring vehicle after receiving the neighboring vehicle lane departure message.

5. A car for performing the neighboring vehicle lane departure warning method as claimed in claim 1, comprising:
  a vehicle body;
  at least one lane departure detection device, disposed on the vehicle body, the lane departure detection device having a detection range behind the vehicle body, wherein when a neighboring vehicle on a lane on which the vehicle body is traveling moves out of the lane, the lane departure detection device detects a lane departure state of the neighboring vehicle and generates a neighboring vehicle lane departure message;

a processor, electrically connected to the lane departure detection device and configured to receive the neighboring vehicle lane departure message;

a warning unit, disposed on the vehicle body and electrically connected to the processor, the processor controlling the warning unit to output a warning signal after receiving the neighboring vehicle lane departure message.

6. The car as claimed in claim 5, wherein the warning unit is a head-up display for displaying the warning signal on a front windshield of the vehicle body.

7. The car as claimed in claim 5, wherein the lane departure detection device is disposed around a periphery of the vehicle body, the lane departure detection device generates the neighboring vehicle lane departure message when a neighboring vehicle in front of the vehicle body moves out of the lane or when a neighboring vehicle on the left, right, front left, rear left, front right or rear right of the vehicle body moves out of its lane next to the lane.

8. A neighboring vehicle lane departure warning system, comprising:
a cloud server;
a plurality of cars connected to the cloud server;
each car including a vehicle body and a neighboring vehicle lane departure warning apparatus disposed on the vehicle body, the neighboring vehicle lane departure warning apparatus including:
a lane departure detection device, having a detection range around the vehicle body, wherein when a neighboring vehicle on a lane on which the vehicle body is traveling or on an adjacent lane moves out of its lane, the lane departure detection device detects a lane departure state of the neighboring vehicle and generates a neighboring vehicle lane departure message;
a processor, electrically connected to the lane departure detection device, the processor being configured to receive the neighboring vehicle lane departure message and upload the neighboring vehicle lane departure message to the cloud server;
a warning unit, disposed on the vehicle body and electrically connected to the processor, the processor controlling the warning unit to output a warning signal after receiving the neighboring vehicle lane departure message;
the cloud server outputting a reminder signal to the cars within a specific distance of the neighboring vehicle after receiving the neighboring vehicle lane departure message.

9. The neighboring vehicle lane departure warning system as claimed in claim 8, wherein the warning signal is displayed on a front windshield of the vehicle body.

10. The neighboring vehicle lane departure warning system as claimed in claim 8, wherein the specific distance is 1 kilometer.

* * * * *